United States Patent [19]

Frison

[11] Patent Number: 4,828,033

[45] Date of Patent: May 9, 1989

[54] APPARATUS AND METHOD FOR TREATMENT OF WELLS

[75] Inventor: Willis C. Frison, Franklin County, Ohio

[73] Assignee: Dowell Schlumberger Incorporated, Del.

[21] Appl. No.: 736,413

[22] Filed: May 20, 1985

Related U.S. Application Data

[63] Continuation of Ser. No. 589,263, Mar. 13, 1984, abandoned, which is a continuation of Ser. No. 279,138, Jun. 30, 1981, abandoned.

[51] Int. Cl.[4] .............................................. F16L 27/00

[52] U.S. Cl. .................................... 166/307; 166/75.1; 166/292; 166/308; 137/615; 137/899; 137/899.2

[58] Field of Search ............ 137/351, 615, 899, 899.2, 137/1; 141/387; 166/75 R, 79, 335, 308, 307, 292, 244 R, 75.1, 244.1

[56] References Cited

U.S. PATENT DOCUMENTS

| | | | |
|---|---|---|---|
| 2,753,940 | 7/1956 | Bonner | 166/308 |
| 2,948,306 | 8/1960 | Kuraeff | 137/615 X |
| 3,329,207 | 7/1967 | Shock et al. | 166/308 X |
| 3,422,895 | 1/1969 | Koonce | 166/79 |
| 3,489,394 | 1/1970 | Stogner et al. | 166/244 R |
| 3,572,380 | 3/1971 | Jackson et al. | 137/615 X |
| 3,675,680 | 7/1972 | Frohlich et al. | 137/615 |
| 3,685,543 | 8/1972 | Schwing et al. | 137/615 |
| 3,707,990 | 1/1973 | Schaible et al. | 137/615 |
| 3,746,060 | 7/1973 | Janssen et al. | 137/615 |
| 3,789,869 | 2/1974 | Morris | 137/615 X |
| 3,889,728 | 6/1975 | Riche | 141/387 |
| 4,109,688 | 8/1978 | Jameson | 137/615 X |
| 4,130,134 | 12/1978 | Castle | 137/615 |
| 4,220,177 | 9/1980 | Gill | 137/615 |
| 4,276,917 | 7/1981 | Fujita | 141/387 |
| 4,388,948 | 6/1983 | Carminati et al. | 141/387 X |
| 4,391,297 | 7/1983 | Knight | 137/615 |
| 4,393,906 | 7/1983 | Gill | 141/387 |
| 4,457,338 | 7/1984 | Moller et al. | 137/615 |

*Primary Examiner*—Gerald A. Michalsky
*Attorney, Agent, or Firm*—Stephen A. Littlefield

[57] ABSTRACT

An apparatus designed for the introduction or removal of fluids from a wellbore, which apparatus comprises an elongated, extendable member and means for extending it; attached to said extendable member a conduit adapted for carrying fluid along said member; and located near an extremity of the extendable member, a means for securing said conduit to the head of a wellbore to permit fluid flow through said conduit and into or from said wellbore. Also, a method for employing the foregoing apparatus to introduce or remove from a wellbore a fluid by attaching a securing means to a wellbore head and introducing into or removing therefrom a fluid by transporting said fluid through the conduit with a fluid transporting means, said fluid flowing in either direction as may be appropriate.

18 Claims, 6 Drawing Sheets

APPARATUS AND METHOD FOR TREATMENT OF WELLS

CROSS-REFERENCE TO RELATED APPLICATION

This is a continuation of application Ser. No. 589,263, filed Mar. 13, 1984, now abandoned, which is a continuation of Ser. No. 279,138 filed on June 30, 1981, now abandoned.

BACKGROUND OF THE INVENTION

An apparatus and method is disclosed for introducing or removing fluids from a wellbore. The apparatus is suitably equipped for mounting on a mobile vehicle, such as a truck or trailer, or on a boat, such as a barge, so that it may be transported from site to site where it is needed.

Previously, treatments of oil and gas wells have entailed connecting together of pieces of pipe known as "iron" from the wellhead to the treating equipment which may consist of trucks and pumps, etc. For safety sake, this string of iron sometimes extends several hundreds of feet and in some cases must be staked securely to the ground when the treatment to be applied is to be carried out under substantial pressure, for example in excess of 500 psi. Hooking up to the well-head involves, in the case of a new well, working on the drilling table, often an unsafe and hazardous operation. Additionally, in the past each piece of iron had to be individually carried, connected, unconnected and reloaded. This has required substantial time, effort and has been accompanied by significant hazards.

The treatment of oil and gas wells has also been carried out through equipment known as "coil tubing". A small diameter pipe is actually inserted through a seal or diaphragm into the wellbore and run to a desired distance within the well and treating is then carried out. Such apparatus is extremely cumbersome and bulky and is not generally designed for the process of fracturing a subterranean formation. The small diameter tubing is not designed to deliver the large quantities of fluid at high rates necessary for such fracturing or at the pressures generally required. A description of coil tubing units for use in treating of wells may be found in Oil and Gas Journal, Jan. 13, 1964, pages 72–73.

In the construction industry, extendable booms have been mounted on the backs of trucks to permit cement slurries to be pumped through a conduit attached to the boom. In that fashion, cement can be delivered to a location which is elevated or which is at a distance from a road or path which would not otherwise be accessible from a standard cement "readimix" truck. Examples of such boom equipment are found in the brochure entitled "TITAN Concrete, Pumps Make the Tough Jobs Easy", bulletin No. CT-479 published by Challenge Cook Brothers. To the best of Applicant's knowledge, such cement boom equipment has not previously been adapted for hook up to gas or oil wells or for the operations to be performed on such wells.

SUMMARY OF THE INVENTION

The invention comprises an apparatus and a method for using the apparatus to introduce fluid into or remove fluid from a wellbore. The apparatus of the invention comprises:

(a) an elongated, extendable member;
(b) means for extending said member;
(c) a conduit attached to said member; and
(d) a means located at one end of such conduit, for securing said conduit to a wellhead, permitting said conduit to communicate with said wellhead.

Suitably, the end of the extendable member distant from that end to which the securing means for the conduit is attached is secured to an anchoring device such as a skid, a tripod, the bed of a truck or trailer, the deck of a boat or barge or other suitable, relatively solid anchor point from which the extendable member may then be projected. Preferably, the apparatus is mounted on the bed of a truck or trailer, or on the deck of a ship or barge, so that the apparatus may be moved from place to place freely. Most preferably, the apparatus is secured to a wheeled vehicle, such as a truck, so as to be highly mobile.

The apparatus may be attached to a skid, tripod, trailer, barge, etc. in a fixed position so that the extendable member may be extended only in one direction from the point of attachment. When so mounted, in order to position the apparatus for connection to a wellhead, the body to which it is fixedly attached is positioned to permit extension of the member in the desired direction and at the appropriate distance to reach the point of attachment to the wellhead. Preferably, the apparatus is mounted on a rotatable mechanism which, in turn, is secured to the skid, truck, boat, etc. In this fashion, the body to which the apparatus is attached may be positioned initially in a convenient place and the apparatus may be rotated so that it will extend in the appropriate direction to the wellhead to which the conduit is to be secured.

In the method of the invention, the apparatus is adapted to be coupled with a pump or other fluid displacement means to transmit fluid either into or from the wellhead, as may be appropriate. In a preferred mode, the apparatus is employed to inject fluid into the wellhead. In another preferred mode, the apparatus is employed to inject a treating fluid into said wellhead which treating fluid may consist of gases, liquids, gasified liquids, or solids suspended in liquids (which may also contain gas). Preferably, the fluid transported in the method of the invention comprises a liquid and preferably the liquid transported into the wellhead in the method of the invention is a standard well treating composition such as oil-or water-based fracturing fluid, aqueous cement slurry, acid, foamed or gelled fluid, proppant bearing fracturing fluid, and the like, all well known to the oilfield. Other objects, aspects and advantages of the invention may be seen in the following text and the drawings.

DETAILED DESCRIPTION OF THE INVENTION

The advantages of the invention in terms of safety and simplification of the fluid treatment of oil and gas wells have been noted above and the apparatus and method of the invention have been generally described.

Several embodiments of the apparatus employed to accomplish these ends are now described in more detail.

Figure 1:
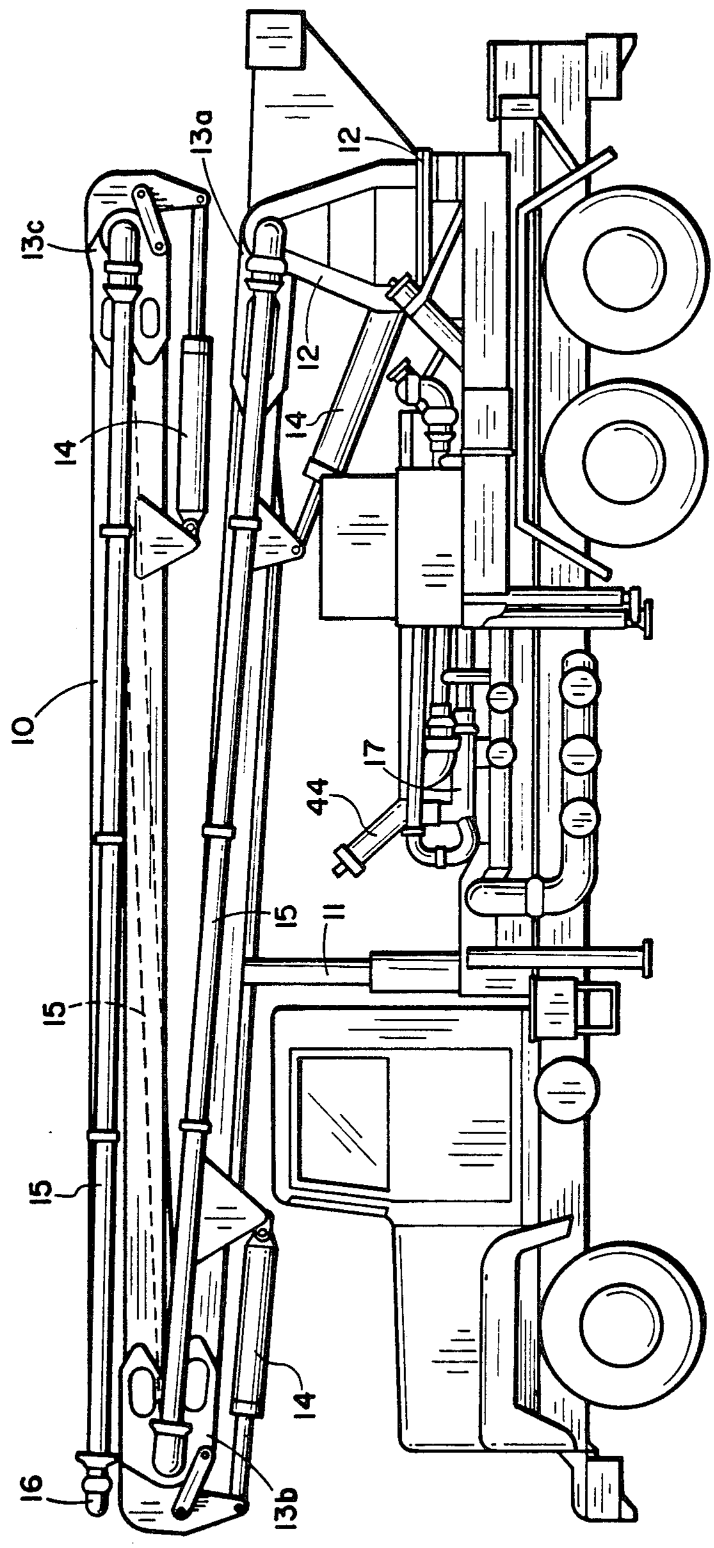
FIG. 1 is a side view of an apparatus of the invention mounted on the chasis of a truck.

FIG. 1 illustrates an embodiment of the apparatus where an elongated, extendable member, represented by reference numeral 10, comprising three segments, is shown mounted in storage position on the back of a truck. Bracket 11 forms a support for the member 10 permitting it to be transported conveniently. At the rear of the truck chasis is fixedly mounted a rotatable turret 12 to which the member 10 is moveably attached by an elbow joint 13*a*. Other elbow joints 13*b* and 13*c* serve to couple the first, second and third segments in extendable fashion to form the entirity of member 10. While a three-segment extendable member is shown in FIG. 1, extendable members of but a single segment or of more than three segments can easily be envisioned, depending on the length of the extendable member desired.

Figure 3:
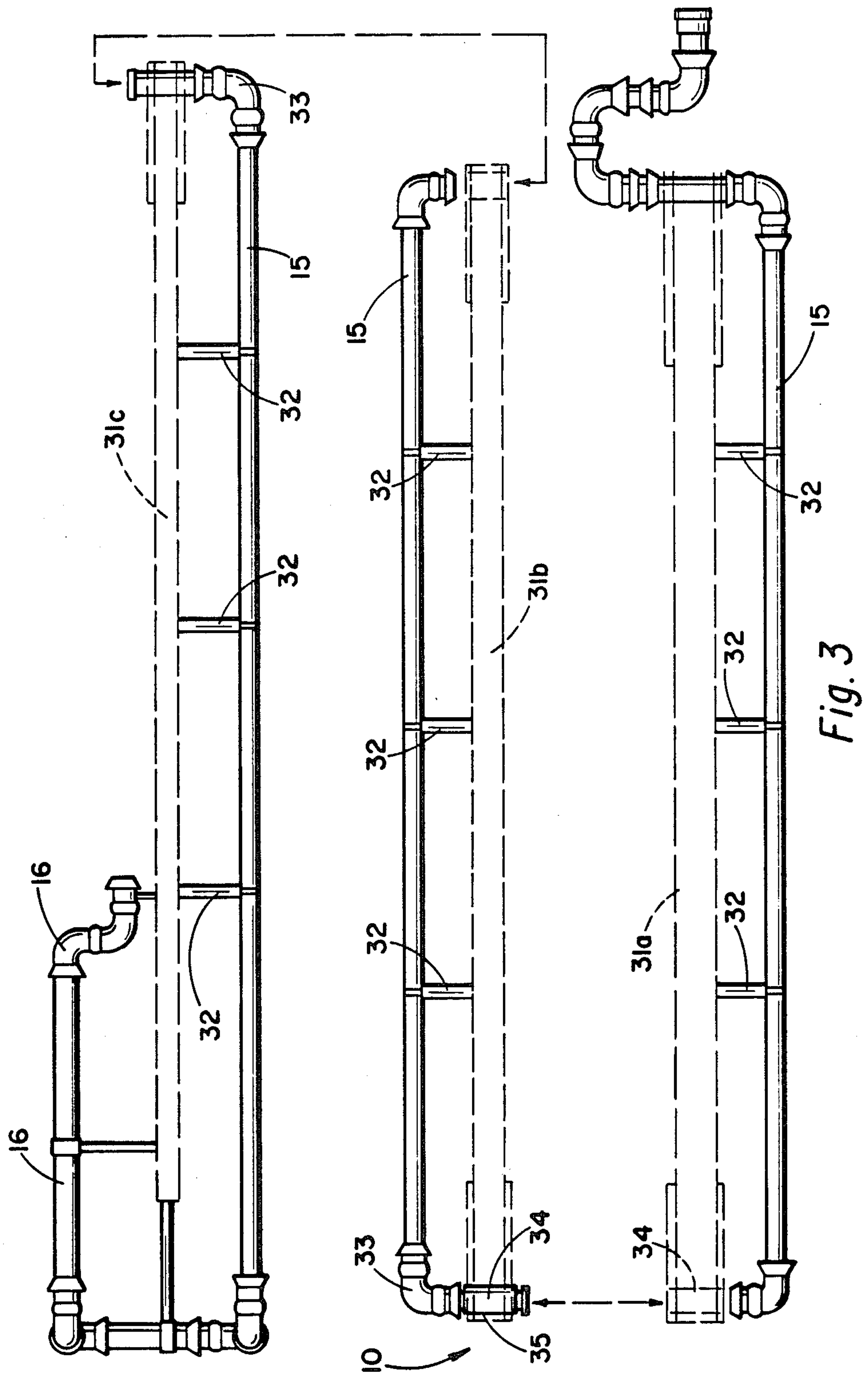
FIG. 3 is an exploded view of a three-segment extendable member illustrating the conduit attached to the extendable member.

As shown in FIG. 1, the member 10 is extendable by means of three hydraulically operated cylinders, generally represented by numeral 14, which may be individually controlled to provide the desired extension of each segment. These cylinders as well as other hydraulically operated devices associated with the apparatus may be powered by one or more hydraulic power sources (not shown) in wellknown manner. Attached to member 10 is a conduit 15 in the form of interconnected segments of pipe running parallel to each segment of member 10 which pipe segments are connected end to end by short segments of pipe and swivel joints, the short pipe segments passing through the orifice of the elbow joints 13*a–c*. Details of this piping are shown in FIG. 3. At the extremity of member 10 not attached to turret 12 is located a means 16 for securing conduit 15 to a wellhead. Further details of means 16 will be found in FIGS. 3 and 3*a*.

In addition to the parts described above, one can observe in FIG. 1 a portion of a manifold 17 adapted for connecting a fluid transporting means (not shown), such as a positive displacement pump, to conduit 15 through piping up through the turret 12. Details of the turret piping are shown in FIG. 2.

Figure 2:
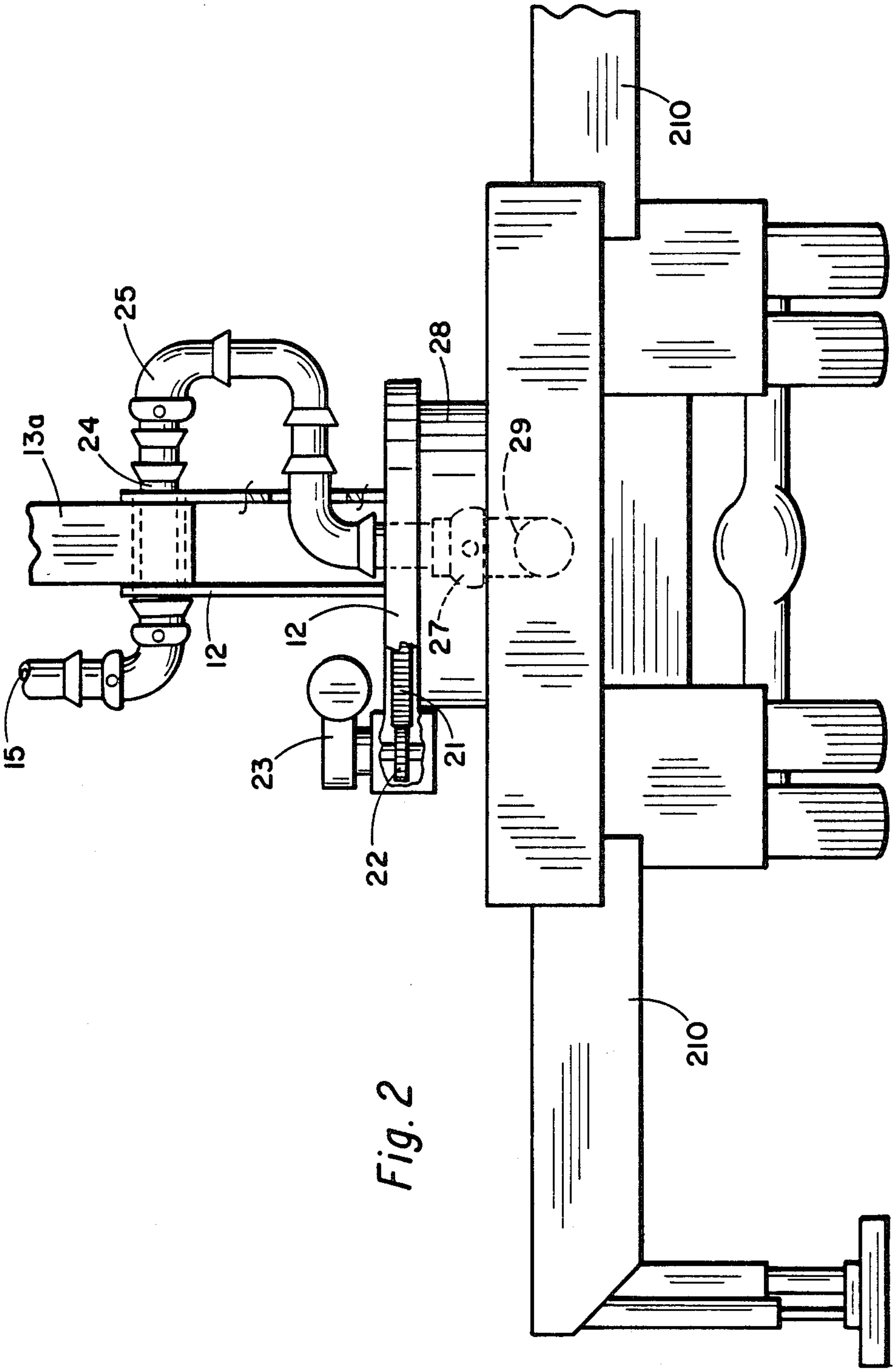
FIG. 2 is an enlarged rear view of the rear portion of the truck showing more detail of the extendable member of the apparatus mounted on a rotatable turret.

In FIG. 2, the turret 12 and rear portion of the truck from FIG. 1, are shown enlarged with portions of the turret cut away to reveal a ring gear 21 fixably mounted about the crown of pedestal 28 ring gear 21 meshing with a pinion gear 22 on its outer circumference which gear 22 is driven by a high torque, low speed hydraulic-powered motor through a gear reduction box represented by 23, mounted near the circumference of the turret base. Naturally other means for rotation of the turret may readily be envisioned.

Projecting from one end of elbow joint 13*a* is a segment of pipe 24 which forms a portion of the lower part of conduit 15 (FIG. 1) which segment 24 is in turn connected by means of threaded end to a swivel joint 25. Swivel joint 25 is a single swivel joint which in turn is connected, by means of threads, to a short segment of pipe 26 to a second single swivel joint 27 which is located centrally under turret 12. Turret 12 is mounted on the top of a vertically oriented cylindrical pedestal 28 and which is secured directly to the truck chasis. Through the hollow center of pedestal 28, swivel joint 27 is connected by means of threads to another segment of pipe 29. This segment 29 in turn communicates with whatever fluid transporting means, e.g. positive displacement pump, may be selected to move fluid into or out of conduit 15 of FIG. 1. In this fashion, turret 12 may rotate 360 degrees while the corresponding rotation of swivel joint 27 permits the selected fluid transporting means to remain in unrestricted communication with conduit 15 of FIG. 1 through pipe segments 29, 26 and joint 25. Also shown is an extendable support member 210, designed to stabilize the truck when extended. Such members are commonly found on backhoes and other heavy construction equipment, counterpoised on opposite sides of such trucks and equipment.

FIG. 3 shows, in exploded detail, the segments of member 10. These segments are represented by reference numerals 31*a–c*. The sections of pipe of which conduit 15 is comprised are mounted on their respective segment of 31 by brackets 32 which are welded laterally and horizontally at regularly spaced intervals along the length of each segment. It is preferable that these segments of conduit 15 be attached to brackets 32 in a removable fashion such as the U-clamp brackets shown in FIG. 3*a*. In this manner, individual segments of pipe may be replaced with relative ease when necessary. Segments 31*a*, *b* and *c* are depicted from top view. On segment 31*c*, left end, is a means 16 for securing conduit 15 to a wellhead. At the end of each of segments 31*b* and 31*c* which are attached by elbow joints to the next lower segment, are shown single swivel joints 33 which permit segments 31*a–c*, when attached by the elbow joints, to extend or fold upon one another and still allow communication of fluid to occur between a section of conduit 15 on one segment of 31 and that on an adjacent segment of 31. If the orifice 34 through an elbow joint 13 is larger in diameter than the conduit pipe passing through 34, it is preferable to insert a sleeve 35 in 34 which will permit the conduit pipe 15 passing through 34 to fit snugly therein. This obviates vibrational motion in conduit 15 at such junctures and provides support for 15 in addition to that provided by brackets 32.

Figure 3A:
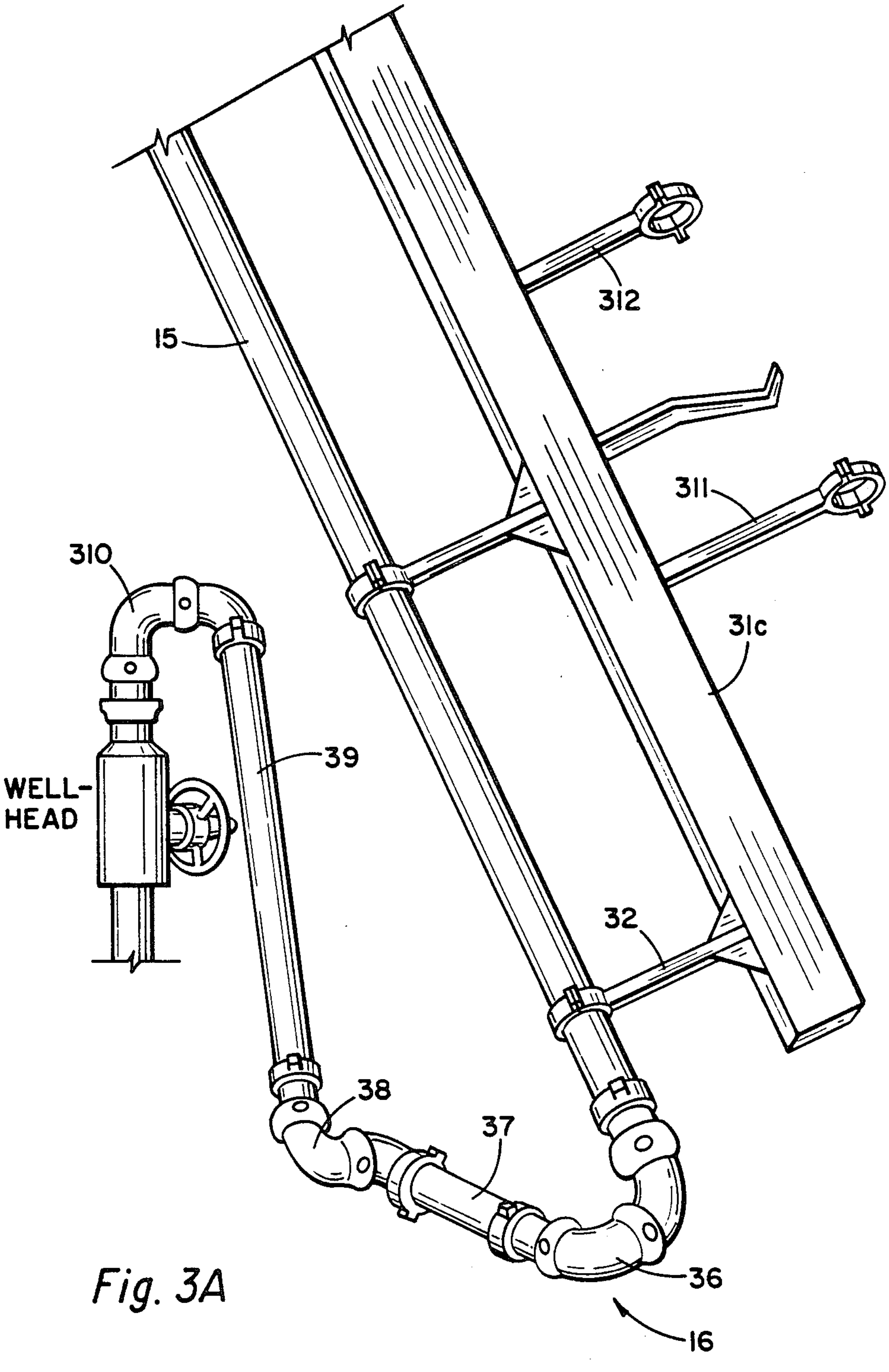
FIG. 3*a* is an enlarged view of one end of the extendable member detailing a means for securing the fluid conduit to a wellhead.

The detail of 16 of FIG. 1 is shown in the enlargement of the extremity of segment 31*c* which is found in FIG. 3*a*. There, conduit 15 final segment is connected in threaded fashion by a triple swivel joint 36. Since a triple swivel joint permits rotation in three dimensions, conduit 15 may be attached directly to a wellhead through the means of joint 36. However, for greater ease of maneuver, it is preferred to provide added components, also attached in a threaded fashion in sequence to joint 36, of a section of pipe 37 of a length about the same as the width of segment 31*c* plus bracket 32, a double swivel joint 38, a longer section of pipe 39, for example 6 to 8 feet in length, terminating in another double swivel joint 310. This highly flexible train of piping from 37 through 310, is preferably secured to segment 31*c* by means of brackets 311 and 312, or other securing means, to prevent this flexible train from swiveling and moving freely when the apparatus is transported from place to place. The sequential train of piping from 36 through 310 may be considered a securing means equivalent to element 16 depicted in FIG. 1.

Figure 4:
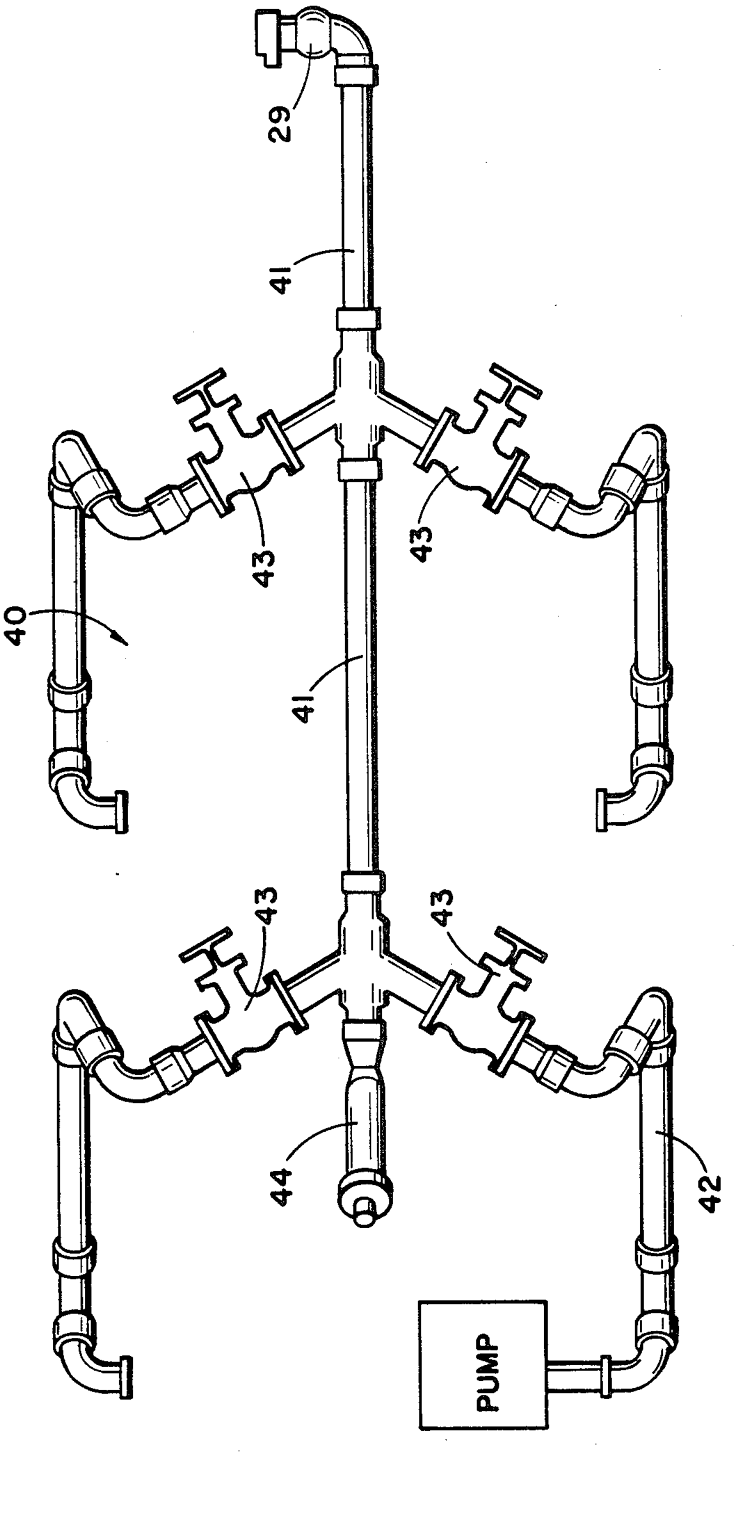
FIG. 4 is an overhead view of a preferred embodiment of a manifold system used to provide a convenient means for connecting fluid transporting means to the apparatus.

In FIG. 4 is shown a manifold 40, viewed from above, which is a preferred means for connecting conduit 15 to the means selected for transporting the fluid, via elements 25, 26, 27 and 29 shown in FIG. 2. Provided are a main line 41, branching to receive four communicating pipes 42, which have valves 43 to which fluid transporting means, here represented in block form as "pump", are attached. Conveniently, a fluid transporting means is provided by hooking up a mobile pumping unit such as is found in the form of a pumper truck in the oilfield. Main line 41, a threaded pipe, communicates directly with element 29. At the other end of 41 is shown a surge chamber 44, also a preferred addition, which serves to suppress pressure fluctuations encountered when pumping into a manifold with positive displacement pumps such as triple cylinder pumps commonly used in the oilfield.

Figure 5:
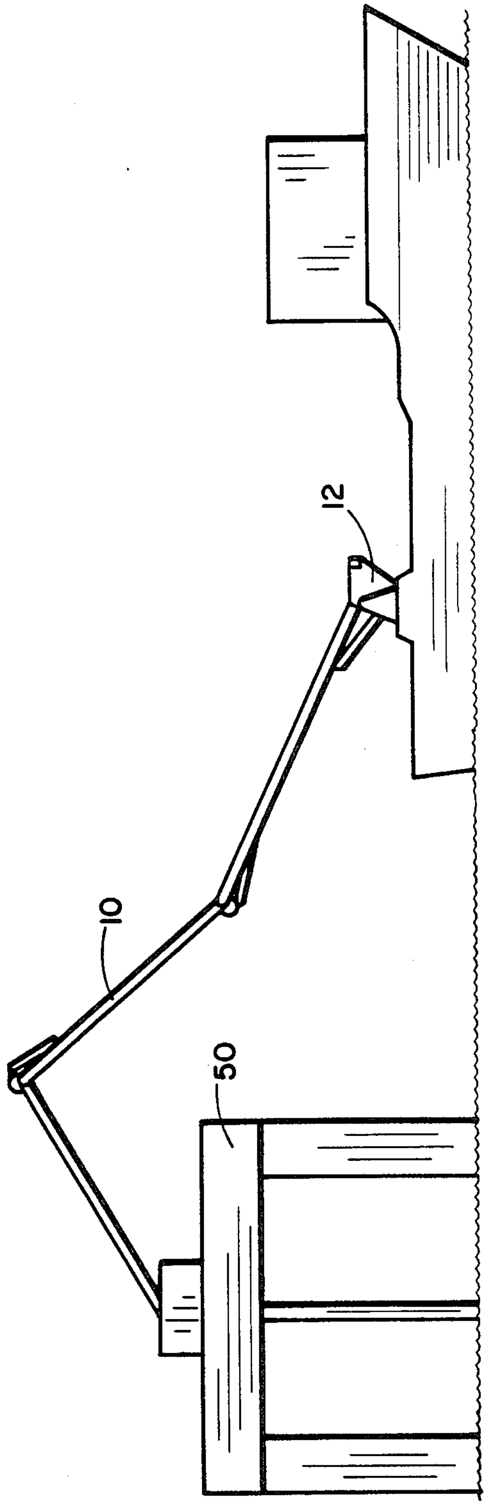
FIG. 5 illustrates another mode of the invention mounted on the deck of a ship, providing fluid to an offshore oil platform.

FIG. 5 represents another mode of the invention where the turret 12 is mounted on the deck of a boat with member 10 extended to the floor of an offshore oil platform 50.

The foregoing description details the arrangement and workings of the elements of embodiments of the invention. The materials for the primary components in an embodiment which comprises a three-segment extendable member of up to about 25 foot length per section, are suitably T1 formed channel steel for the extendable member's segments and turret. The conduit is suitably formed from 4 inch nominal (4.5 in. O.D.) pipe of AISI 4340 alloy steel or equivalent. Such pipe is commonly referred to as 4.5 inch casing or treating iron in the oilfield and rated at up to 10,000 psi burst strength. Lower strength piping may be employed for lower pressure applications. One may likewise substitute 3, 5 or 6 inch pipe if desired, if corresponding size modification is made in other elements and if extendable member segments of suitable strength are employed. The swivel joints described in the embodiments are Chiksan swivel joints supplied to the oilfield routinely by FMC Corporation.

Preferred methods of connecting the various elements of the apparatus have been described, e.g. bracket clamps, threaded pipes and swivel joints, but these are not critical to the invention and welding, bolting or the like may be substituted unless special characteristics of the connection, e.g. elbow joints between segments of the extendable member or rotatable securing means at ends of the conduit, are desired.

Use of the apparatus to flow fluid into or from a wellbore is straight forward. Instead of connecting a pump truck as fluid transporting means to the conduit, one may wish to merely mount one or more pumps on the chasis of a truck bearing the invention apparatus and hook the pumps' discharge or suction ends to the extremity of the conduit at the turret in order to flow fluid in the direction desired, i.e. out of or into, respectively, the end of the conduit to be attached to the wellbore.

I claim:

1. An apparatus for the conveyance of a fluid, which apparatus is in communication with a wellbore, the apparatus comprising:
   (a) an elongated, extendable member anchored at a first end;
   (b) means for extending said member;
   (c) a conduit mounted on said extendable member in a manner which permits full extension of said member, said conduit communicating with a wellhead of the wellbore;
   (d) means positioned near a second end of the extendable member and connected to said conduit, for joining said conduit to the wellhead to establish the communication of the conduit with the wellhead.

2. The apparatus of claim 1 wherein the extendable member comprises a plurality of linear segments, movably attached in series, in such a fashion that said segments are longitudinally aligned when the member is in an extended position and when said member is in a retracted position.

3. The apparatus of claim 2 wherein one linear segment is movably attached to an adjacent linear segment at one point only, said point being near an extremity of each of said segments.

4. The apparatus of claim 3 wherein the linear segments are attached to adjacent segments by elbow joints which permit extension of said segments along the longitudinal axis of said member.

5. The apparatus of claim 1 or 2 wherein the extendable member is anchored to a frame of a wheeled vehicle.

6. The apparatus of claim 5 wherein the extendable member is anchored in a fashion that permits said member to be rotated radially about the region of attachment.

7. The apparatus of claim 6 which further comprises a plurality of support members movably attached to said wheeled vehicle, and adapted to stabilize said vehicle, and thereby avoid upset of said vehicle when the extendable member is in an extended position.

8. The apparatus of claim 1 or 2 wherein the member is anchored to a deck of a water-floatable vessel.

9. The apparatus of claim 1 or 2 wherein said conduit is a pipe.

10. The apparatus of claim 1 or 2 wherein the means for securing said conduit to the wellhead is rotatable both laterally and longitudinally.

11. The apparatus of claim 10 wherein the means for securing said conduit to said well-head comprises a plurality of swivel joints connected end to end in sequence and wherein the swivel joint at one end of said sequence is communicatingly connected to said conduit and wherein the swivel joint at the other end of said sequence is suitably adapted for communicating connection with said wellhead.

12. The apparatus of claim 1 wherein said apparatus is mounted on a rotatable means secured to a wheeled vehicle.

13. The apparatus of claim 1 which further comprises fluid transportation means for transporting fluid through said conduit.

14. The apparatus of claim 13 wherein said fluid transportation means comprises at least one positive displacement pump.

15. A method of transporting a fluid through a conduit in communication with a wellbore which comprises (1) joining to a wellhead of a wellbore an apparatus which comprises:
   (a) an elongated, extendable member anchored at a first end;
   (b) means for extending said member;
   (c) a conduit associated with said extendable member in a manner which permits full extension of said member;
   (d) means positioned near a second end of the extendable member and associated with said conduit, for joining said conduit to the wellhead to establish communication of the conduit with the wellhead, by the means positioned near the second end; and, thereafter (2) causing said fluid to flow through the conduit in the direction desired by appropriately operating a fluid transportation means.

16. The method of claim 15 wherein the fluid is transported into the wellbore.

17. The method of claim 16 wherein the fluid transported is selected from a liquid, gasified liquid, and a suspension of solids in a liquid.

18. The method of claim 17 wherein the fluid is selected from a fracturing fluid and an aqueous cement slurry.

* * * * *